United States Patent
Hunter et al.

(10) Patent No.: US 9,015,030 B2
(45) Date of Patent: Apr. 21, 2015

(54) TRANSLATING PROMPT AND USER INPUT

(75) Inventors: Graham Hunter, Manchester (GB); Ian McCloy, Salford (GB)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 13/447,234

(22) Filed: Apr. 15, 2012

(65) Prior Publication Data

US 2013/0103384 A1    Apr. 25, 2013

(30) Foreign Application Priority Data

Apr. 15, 2011   (EP) .................................... 11162658

(51) Int. Cl.
*G06F 17/28*  (2006.01)
*G06F 9/44*  (2006.01)

(52) U.S. Cl.
CPC .............. *G06F 17/28* (2013.01); *G06F 17/289* (2013.01); *G06F 9/4448* (2013.01)

(58) Field of Classification Search
CPC .............. G06F 17/289; G06F 17/2872; G06F 17/2836; G06F 17/2755; G06F 17/271
USPC .......................................................... 704/3
See application file for complete search history.

(56) References Cited

U.S. PATENT DOCUMENTS

| | | | | |
|---|---|---|---|---|
| 5,179,657 A | * | 1/1993 | Dykstal et al. | 715/762 |
| 5,392,386 A | * | 2/1995 | Chalas | 715/841 |
| 5,416,903 A | * | 5/1995 | Malcolm | 715/703 |
| 5,533,184 A | * | 7/1996 | Malcolm | 715/762 |
| 5,544,288 A | * | 8/1996 | Morgan et al. | 715/801 |
| 5,546,304 A | * | 8/1996 | Marschner et al. | 704/4 |
| 5,583,761 A | * | 12/1996 | Chou | 715/201 |
| 5,668,959 A | * | 9/1997 | Malcolm | 715/762 |
| 5,854,997 A | * | 12/1998 | Sukeda et al. | 704/3 |
| 5,907,326 A | * | 5/1999 | Atkin et al. | 715/866 |
| 5,974,372 A | * | 10/1999 | Barnes et al. | 704/8 |
| 6,023,670 A | * | 2/2000 | Martino et al. | 704/8 |
| 6,334,101 B1 | * | 12/2001 | Hetherington et al. | 704/8 |
| 6,338,033 B1 | * | 1/2002 | Bourbonnais et al. | 704/3 |
| 6,490,547 B1 | * | 12/2002 | Atkin et al. | 704/8 |

(Continued)

OTHER PUBLICATIONS

Carson-Berndsen et al., "Integrated Language Technology as Part of Next Generation Localisation", vol. 8 Issue 1 of The International Journal of Localisation, pp. 53 -66, 2009 URL: http://hdl.handle.net/2262/58801.

*Primary Examiner* — Pierre-Louis Desir
*Assistant Examiner* — Fariba Sirjani
(74) *Attorney, Agent, or Firm* — Yudell Isidore PLLC; Steven L. Bennett

(57) ABSTRACT

A method for intercepting an application prompt before it reaches the user interface, wherein the application prompt has been transmitted from the computer application and intended to reach the user interface. The method also includes translating the intercepted application prompt from a source language to a target user language, and in response to translating the intercepted application prompt, transmitting the translated application prompt to the user interface. The method also includes intercepting, in response to the application prompt, user input from the user interface, wherein the user input is intended to reach the computer application. The method also includes translating the user input from the target language to the source language, and in response to translating the intercepted application prompt, transmitting the translated user input to the computer application.

20 Claims, 22 Drawing Sheets

(56) References Cited

U.S. PATENT DOCUMENTS

| | | | |
|---|---|---|---|
| 6,901,367 B1* | 5/2005 | Berstis et al. | 704/277 |
| 6,938,259 B2* | 8/2005 | McGeorge, Jr. | 719/313 |
| 6,950,792 B1* | 9/2005 | Nussbaum | 704/8 |
| 6,996,518 B2* | 2/2006 | Jones et al. | 704/8 |
| 6,999,932 B1* | 2/2006 | Zhou | 704/277 |
| 7,318,020 B1* | 1/2008 | Kim | 704/2 |
| 7,392,519 B2* | 6/2008 | Nguyen et al. | 717/170 |
| 7,398,215 B2* | 7/2008 | Mesbah et al. | 704/277 |
| 7,437,704 B2* | 10/2008 | Dahne-Steuber et al. | 717/100 |
| 7,447,624 B2* | 11/2008 | Fuhrmann | 704/8 |
| 7,475,390 B2* | 1/2009 | Berstis et al. | 717/136 |
| 7,672,852 B2* | 3/2010 | Millett et al. | 704/277 |
| 7,698,126 B2* | 4/2010 | Kohlmeier et al. | 704/8 |
| 7,720,856 B2* | 5/2010 | Goedecke et al. | 707/759 |
| 7,721,271 B2* | 5/2010 | Pournasseh et al. | 717/137 |
| 7,774,195 B2 | 8/2010 | Kohlmeier et al. | |
| 7,877,251 B2* | 1/2011 | Kumaran et al. | 704/2 |
| 8,024,196 B1* | 9/2011 | Wodtke et al. | 704/277 |
| 8,145,472 B2* | 3/2012 | Shore et al. | 704/2 |
| 8,230,021 B2* | 7/2012 | Sumner et al. | 709/206 |
| 8,250,083 B2* | 8/2012 | Bennett | 707/756 |
| 8,296,126 B2* | 10/2012 | Vuong | 704/5 |
| 8,412,511 B2* | 4/2013 | Jackson | 704/3 |
| 8,521,513 B2* | 8/2013 | Millett et al. | 704/9 |
| 8,655,644 B2* | 2/2014 | Kanevsky et al. | 704/3 |
| 8,752,010 B1* | 6/2014 | Penner | 717/111 |
| 2004/0199373 A1* | 10/2004 | Shieh | 704/2 |
| 2004/0230416 A1* | 11/2004 | Ye et al. | 704/5 |
| 2006/0080079 A1* | 4/2006 | Yamabana | 704/2 |
| 2006/0080082 A1* | 4/2006 | Ravindra et al. | 704/8 |
| 2006/0116864 A1* | 6/2006 | McHugh et al. | 704/2 |
| 2007/0179775 A1* | 8/2007 | Bauman et al. | 704/8 |
| 2008/0077384 A1* | 3/2008 | Agapi et al. | 704/2 |
| 2008/0147378 A1* | 6/2008 | Hall | 704/4 |
| 2008/0172218 A1* | 7/2008 | Suzuki | 704/2 |
| 2008/0221867 A1* | 9/2008 | Schreiber | 704/8 |
| 2008/0262827 A1* | 10/2008 | DeGroot | 704/3 |
| 2009/0106017 A1* | 4/2009 | D'Agostini | 704/3 |
| 2009/0132232 A1* | 5/2009 | Trefler | 704/2 |
| 2009/0158137 A1* | 6/2009 | Ittycheriah et al. | 715/234 |
| 2009/0210214 A1* | 8/2009 | Qian et al. | 704/2 |
| 2009/0222257 A1* | 9/2009 | Sumita et al. | 704/3 |
| 2009/0228264 A1* | 9/2009 | Williams et al. | 704/9 |
| 2009/0234633 A1* | 9/2009 | Chao-Suren et al. | 704/2 |
| 2009/0248392 A1* | 10/2009 | Talwar et al. | 704/3 |
| 2009/0276206 A1* | 11/2009 | Fitzpatrick et al. | 704/2 |
| 2010/0004918 A1* | 1/2010 | Lee et al. | 704/3 |
| 2010/0299150 A1* | 11/2010 | Fein et al. | 704/277 |
| 2010/0313255 A1* | 12/2010 | Khuda | 726/7 |
| 2011/0077935 A1* | 3/2011 | Viswanadha et al. | 704/7 |
| 2011/0106527 A1* | 5/2011 | Chiu | 704/9 |
| 2011/0252316 A1* | 10/2011 | Pahud et al. | 715/264 |
| 2012/0016655 A1* | 1/2012 | Travieso et al. | 704/2 |
| 2012/0022851 A1* | 1/2012 | Bremner et al. | 704/3 |
| 2012/0078607 A1* | 3/2012 | Sumita | 704/2 |
| 2013/0041651 A1* | 2/2013 | Dalal et al. | 704/2 |
| 2013/0103384 A1* | 4/2013 | Hunter et al. | 704/3 |
| 2013/0138421 A1* | 5/2013 | Moulder | 704/3 |
| 2013/0298139 A1* | 11/2013 | Resnick et al. | 719/316 |
| 2013/0339404 A1* | 12/2013 | Chao et al. | 707/821 |

* cited by examiner

| GUI 400 for Application Interaction Translator Settings | - | □ | X |
|---|---|---|---|

| Source Language Determination 402 | Automatic [ ] | Manual [X] |
|---|---|---|

| Source Language 404 | English |
|---|---|

| Target Language 406 | French |
|---|---|

Further Language Interface 408 [+]

| Translation Server Addresses 410 |
|---|
| 1 | Local://translationserver.com |
| 2 | http://www.besttranslationservices.com |
| 3 | http://translationsdirect.com |

| Translation Service Determination 412 | Automatic [ ] | Manual [X] |
|---|---|---|

Figure 4

| GUI Application Interaction Translator 500 | | | 501 | - | □ | X |
|---|---|---|---|---|---|---|
| Toolbar 502 | Save 502.2 | Load 502.4 | Source/Target 502.6 | | Settings 502.8 | |

Source Frame 504S

Source GUI 506S | - | □ | X

508S Please enter your name

Jean Smith

510S Please enter your request

The disk drive in my order 12357 is faulty and I am returning it for a replacement Target Frame 504T

Target GUI 506T | - | □ | X

508T Entrer votre nom s'il vous plait

Jean Smith

510T Entrer votre request s'il vous plait

Le lecteur de disque dans ma commande 12357 est defectueux et je suis le retourner pour un replacement

Figure 5F

| Source Terminal 600S    - ☐ ✕ | Target Terminal 600T    - ☐ ✕ |
|---|---|
| App>Please enter your name | App>Entrer votre nom s'il vous plait |

Figure 6B

Source Terminal 600S

App>Please enter your name

Target Terminal 600T

App>Entrer votre nom s'il vous plait

User>*Jean Smith*

Figure 6C

| Source Terminal 600S | -□X |
|---|---|

App>Please enter your name

User>Jean Smith

App>Please enter your request

| Target Terminal 600T | -□X |
|---|---|

App>Entrer votre nom s'il vous plait

User>Jean Smith

Figure 6E

| Source Terminal 600S | - □ X |
|---|---|
| App>Please enter your name<br>User>Jean Smith<br>App>Please enter your request | |

| Target Terminal 600T | - □ X |
|---|---|
| App>Entrer votre nom s'il vous plait<br>User>Jean Smith<br>App>Entrer votre request si'l vous plait | |

Figure 6F

| Source Terminal 600S  - □ X |
|---|
| App>Please enter your name |
| User>Jean Smith |
| App>Please enter your request |

| Target Terminal 600T  - □ X |
|---|
| App>Entrer votre nom s'il vous plait |
| User>Jean Smith |
| App>Entrer votre request si'l vous plait |
| User>Le lecteur de disque dans ma commande 12357 est defectueux et je suis le retourner pour un replacement |

Figure 6G

| Source Terminal 600S | Target Terminal 600T |
|---|---|
| App>Please enter your name | App>Entrer votre nom s'il vous plaît |
| User>Jean Smith | User>Jean Smith |
| App>Please enter your request | App>S'il vous plaît entrez votre demande |
| User>*The disk drive in my order 12357 is faulty and I am returning it for a replacement* | User>Le lecteur de disque dans ma commande 12357 est defectueux et je suis le retourner pour un replacement |

Figure 6H

TRANSLATING PROMPT AND USER INPUT

CLAIM FOR PRIORITY

The present application claims priority under 35 U.S.C. §119(a) to European Patent Application No. EP11162658.6, entitled "Translating Prompt and User Input," filed on Apr. 15, 2011, the disclosure of which is hereby incorporated by reference in its entirety.

TECHNICAL FIELD

This invention relates to a method and apparatus for translating prompts and user input from a source to a target user language. In particular this relates to a method and apparatus for translating an application prompt from a source user language to a target user language and translating a corresponding user response back from the source to the target user language for use with the application.

DESCRIPTION OF THE RELATED ART

Typically a computer service for users provides output and/or takes input in more than one language, for example, product support across different countries. A service provider in one country can only provide an effective service to a customer in another country if the service provider has systems configured and setup with the customer's language. But there are many countries and there is a large financial barrier to providing a service for every language. Increasing, companies are relying on automated translation to provide translation of services to other languages because this is much cheaper. A similar problem and financial barrier exists for software products developed in a one language and intended for other languages. The cost for providing a product or service in other languages can be prohibitive, especially for small companies.

Therefore, there is a need in the art to address the aforementioned problem.

BRIEF SUMMARY

Aspects of the described invention provide a method, a system, and a computer program product for handling computer interactions between a computer application and a user interface. The method includes intercepting an application prompt before it reaches the user interface, wherein the application prompt has been transmitted from the computer application and intended to reach the user interface. The method also includes translating the intercepted application prompt from a source language to a target user language, and in response to translating the intercepted application prompt, transmitting the translated application prompt to the user interface. The method also includes intercepting, in response to the application prompt, user input from the user interface, wherein the user input is intended to reach the computer application. The method also includes translating the user input from the target language to the source language, and in response to translating the intercepted application prompt, transmitting the translated user input to the computer application.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 4 is an example schematic screen diagram showing a graphical user interface of user settings of the preferred embodiment;

FIGS. 5A to 5H are example screens showing states of a graphical user interface of the preferred embodiment; and FIGS. 6A to 6H are example screens showing states of a terminal user interface of another embodiment.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
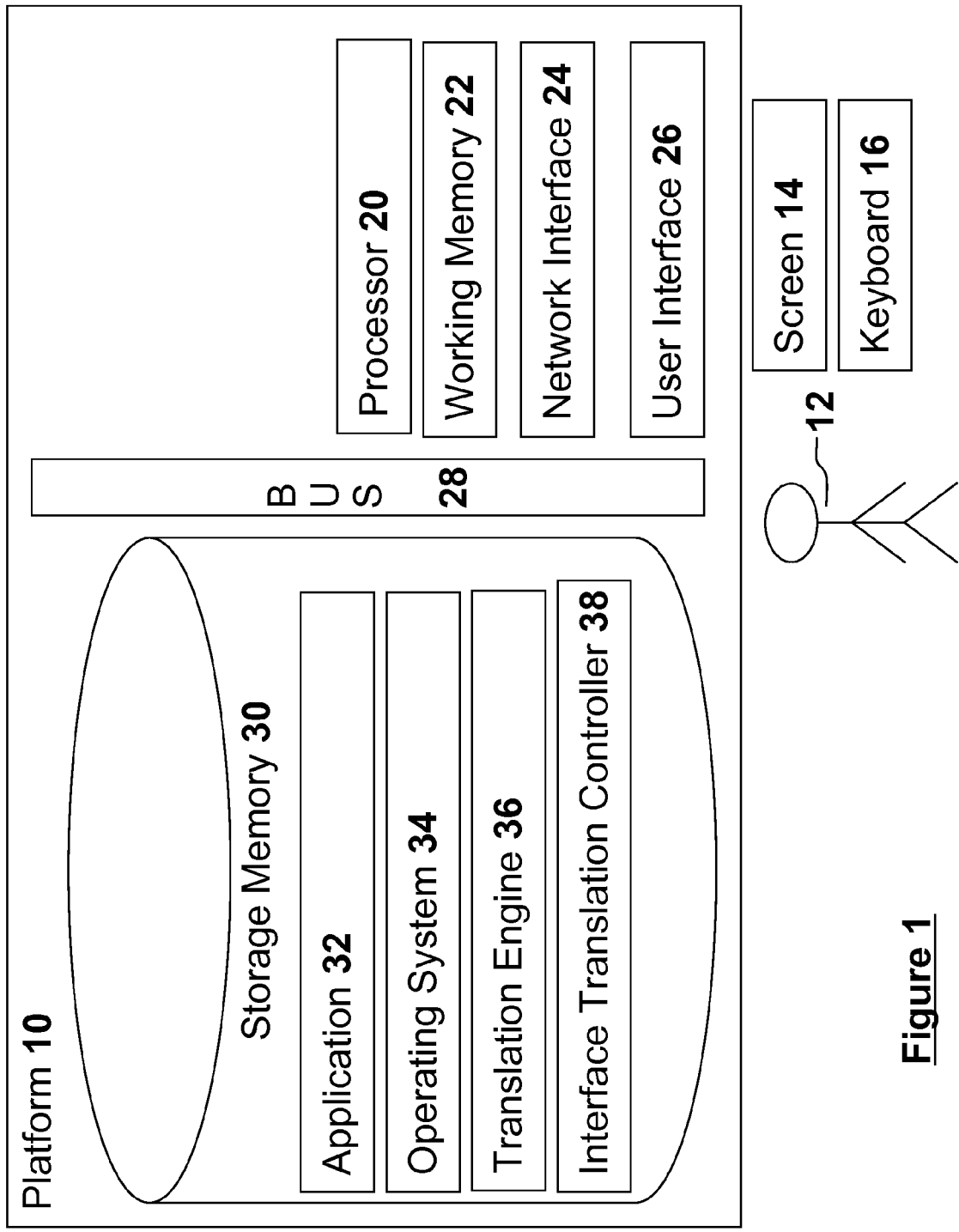
FIG. 1 is a schematic deployment diagram of the system of the preferred embodiment.

Referring to FIG. 1, there is shown a deployment diagram of a platform 10 for interaction with user 12 using screen 14 and keyboard 16. Platform 10 comprises: processor 20; working memory 22; network interface 24; platform user interface 26; bus 28 and storage memory 30. An example of platform 10 is an IBM* POWER* 750 Express* server.

Processor 20 takes instructions and data from working memory 22 for performing logical operations on data according to the instructions. Examples of instructions include add data, subtract data, read data, write data. An example of a processor is an IBM POWER7* processor. *IBM, Express, POWER, POWER7 are trademarks of International Business Machines in the US and/or other countries Working memory 22, faster than storage memory 30, is designed for fast access so that it does not limit processor speed. In operation processor 20 accesses and executes code stored in working memory 22. An example of the code is operating system 34 and application 32. An example of execution memory is 8 GB to 512 GB registered dual in-line memory modules (RDIMM) comprising a series of dynamic random access memory (DRAM) integrated circuits.

Network interface 24 is for communicating with other platforms connected to platform 10 on a network, for example, a local area network (LAN) or the Internet. Typically such communications are service calls when platform 10 will request another network device to provide a service such as performing an operation on supplied data.

Platform user interface 26 is for receiving input from user 12 via keyboard 16, mouse or other human input device. It is also for sending output to user 12 via screen 14, speakers or other human output device.

Bus 28 provides the communication paths for instructions and data between processor 20, working memory 22, network interface 24, platform user interface 26 and storage memory 30.

Storage memory 30 is slower than working memory but is designed to hold much more data than execution memory. An example of storage memory is an 8 Tb disk drive. When the platform is not operating then working memory 22 is empty; storage memory 30 stores both execution code for upload to working memory and data for use with the execution code. The execution code of the preferred embodiment comprises; application 32; operating system 34; translation engine 36 and interface translation controller 38.

Application 32 can be any application that interacts with a user using the standard operating system 34 methods for input and output.

Operating system 34 is for providing basic platform operating functions such as file storage and input/output functions. User input data from the keyboard 16 and platform user interface 26 is managed by the operating system 34 before passed to the application 32. Output data for the screen 14 is managed first by the operating system 34 before passing through the platform user interface 26 to the screen 14. In the preferred embodiment operating system input and output methods are modified so that input data and output data is intercepted by the interface translation controller (ITC) 38. In the preferred embodiment, the application will send output and expect into from the operating system but the actual handling of the output is managed by ITC 38.

Translation engine 36 provides a local translation service between a user language pair, for example, between English and French.

Figure 2:
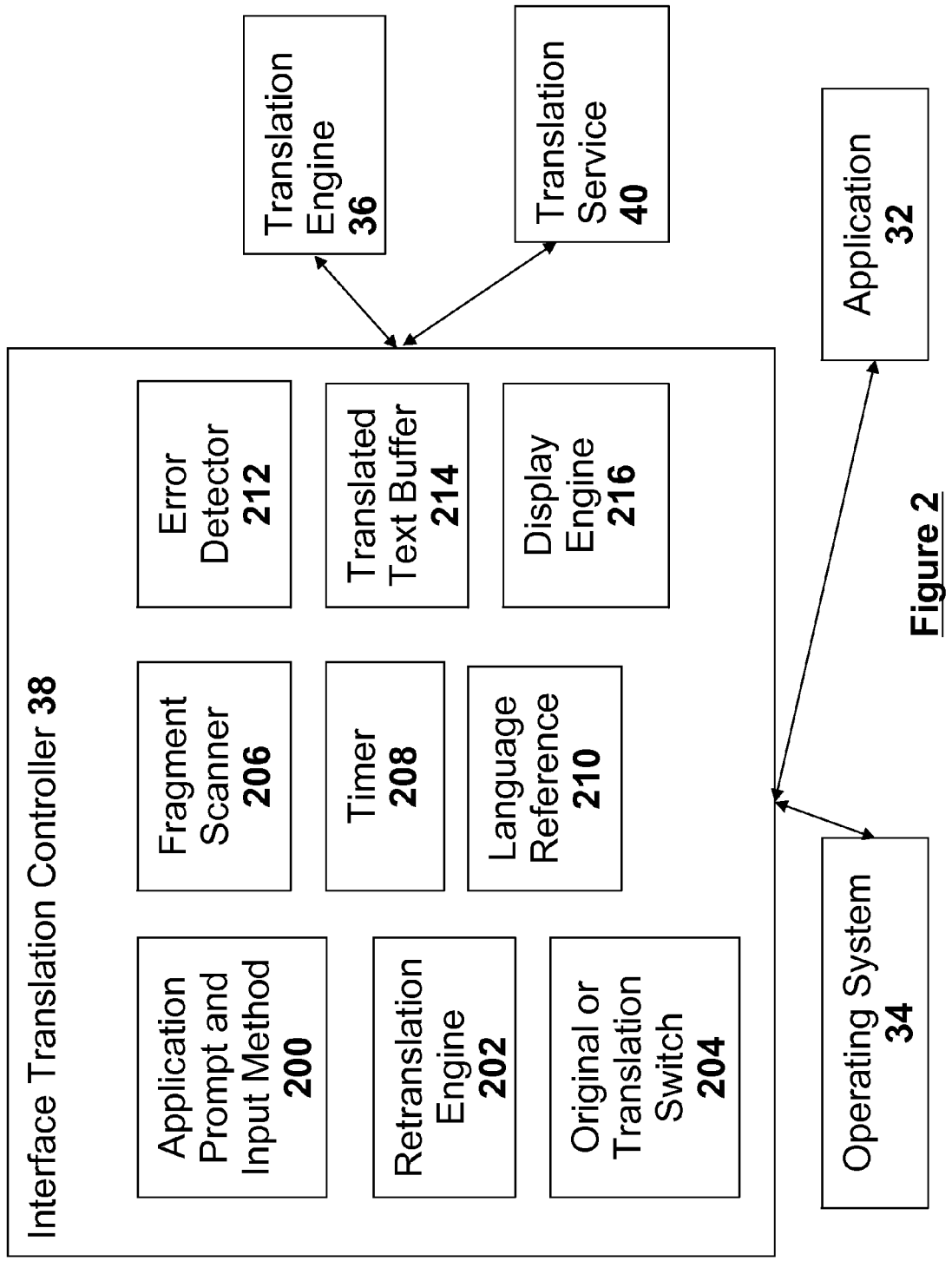
FIG. 2 is a schematic component diagram of the preferred embodiment.

Interface translation controller (ITC) 38 is the engine of the preferred embodiment. Referring to the schematic component diagram of FIG. 2, interface translation controller 38 comprises: application prompt and input method 200; retranslation engine 202; original or translation switch 204; fragment scanner 206; timer 208; language reference 210; error detector 212; translated text buffer 214; and display engine 216.

Application prompt and input method 200 is the main process for managing output prompts from application 32 to the platform user interface 26 and for managing user inputs from the platform user interface 26 to application 32. It is described in more detail below.

Retranslation engine 202 provides a user option for having buffered text translated again; for instance, to override input chunking or when a new language translation has been selected by the user.

Original or translation switch 204 provides a method for toggling between a graphical user interface for the target language or for the source language or both.

Fragment scanner 206 provides for scanning user input for common sentence ending punctuation or stop words that might signal an appropriate chunk of user input to translate.

Timer 208 provides a threshold time when a fragment of user input is cut off and sent for translation. The threshold time can end before the fragment scanner 210 finds ending punctuation characters.

Language reference 210 is for holding data so that source and/or target languages can be detected.

Error detection 212 is for performing two major functions. First, determining whether the translation service has failed; then it will attempt to fall back to another service if one has been defined, or indicate an error to the user if unable. Second, validating the translation; this is an optional feature giving more confidence to a user but necessary in an embodiment that includes language auto-detection. The translated text is sent back to the translation service 40, asking for a reverse translation in the original language, and see how many words match (word order might be changed). If the match rate is too low then this is an indication that the wrong language was used, for example, Portuguese instead of Spanish. Two similar languages will not be the same, and a language auto-detection feature may get it wrong when just handed small fragments of text.

Translated text buffer 214 is for holding the current application prompts; user input data and translations.

Display engine 216 is for providing the graphical user interface of the present embodiment that displays one or other or both of an application graphical user application interface for the target language and a simulated second application graphical user application interface for the source language.

Application prompt and input method 200 comprises: main logical process steps 200.2 to 200.18 as described with reference to FIG. 3A. Preferred logical sub-process steps 200.6.2 to 200.6.8 for optimized translation are described with reference to FIG. 3B. Preferred logical sub-process steps 210.10.2 to 210.10.8 for optimized handling of user input are described with reference to FIG. 3C.

Figure 3A:
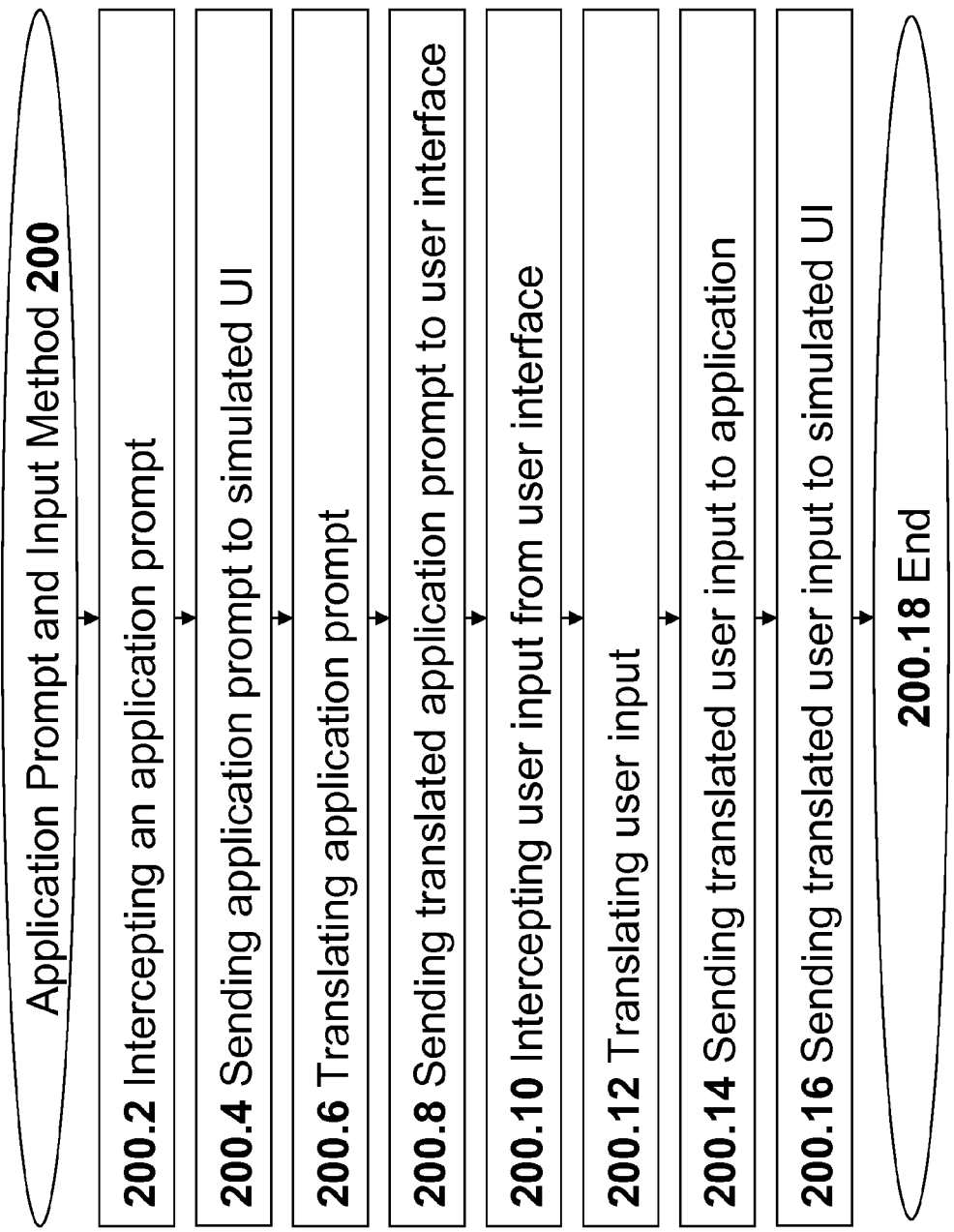
FIGS. 3A to 3C are schematic method diagrams of the preferred embodiment.

Referring to FIG. 3A, application prompt and input method 200 comprises main logical process steps 200.2 to 200.18.

Step 200.2 is for intercepting an application prompt from the application before it gets to the platform user interface 26. An interrupt in the operating system detects output for the application and reroutes the user prompt to ITC 38.

Step 200.4, optional and controlled by the user, is for sending the application prompt, before translation, to a simulated source user interface. A simulated source user interface is controlled by ITC 38 and receives no actual user input but only that sent to it by the ITC 38. The simulated source user interface displays the user prompts and user input in the source language.

Step 200.6 is for translating the application prompt using a translation service, normally by requesting a translation for text X from language A to language B. See description accompanying FIG. 3B for an optimized translation process.

Step 200.8 is for sending the translated application prompt to a target user interface.

Step 200.10 is for intercepting user input from the target user interface before it is sent to the application. Since the ITC 38 controls the target interface then it also understand when user input from the target interface is received. However, another way is for an interrupt in the operating system to detect user input for the application. An optimized interception of user input is described in relation to FIG. 3C.

Figure 3B:
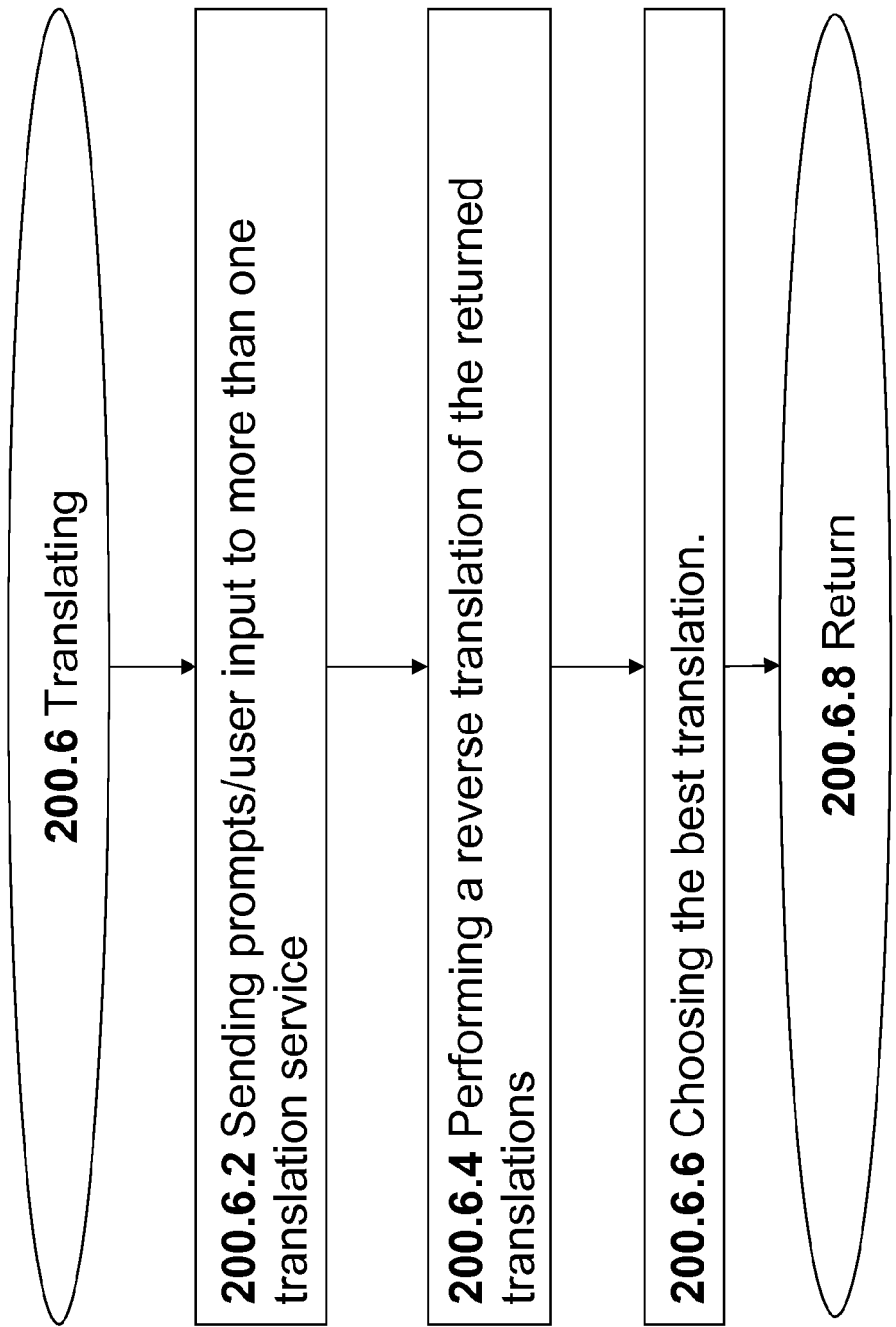

Step 200.12 is for translating user input. The process is similar for translating application prompts as described in relation to step 200.6. In the preferred embodiment the optimized process of FIG. 3B is used.

Step 200.14 is for sending the translated user input to the application so that the application can continue its normal process. Tight coupling of ITC 38 and the operating system allows the ITC and the application to perform independently. In another embodiment ITC may be coupled directly to the application whereby there is no independence.

Step 200.16, optional and controlled by the user as for step 200.4, is for sending the translated user input to the source user interface. The simulated source user interface simply displays the user prompts and user input in the source language.

Step 200.18 signals the end of the main process.

Referring to FIG. 3B, optional logical sub-process steps 200.6.2 to 200.6.8 for optimizing translating step 206 are described.

Step 200.6.2 is for sending prompts or user input to one or more translation services. One of the translation services can be local translation engine 36 and others can be networked translation services.

Step 200.6.4 is for performing a reverse translation of the returned translations. The same or a reference translation service may be used but in the preferred embodiment the local translation service 36 is used for speed.

Step 200.6.6 is for choosing the best translation and using it.

Step 200.6.8 signals the end of the sub-process and return to the main process 200.

Figure 3C:
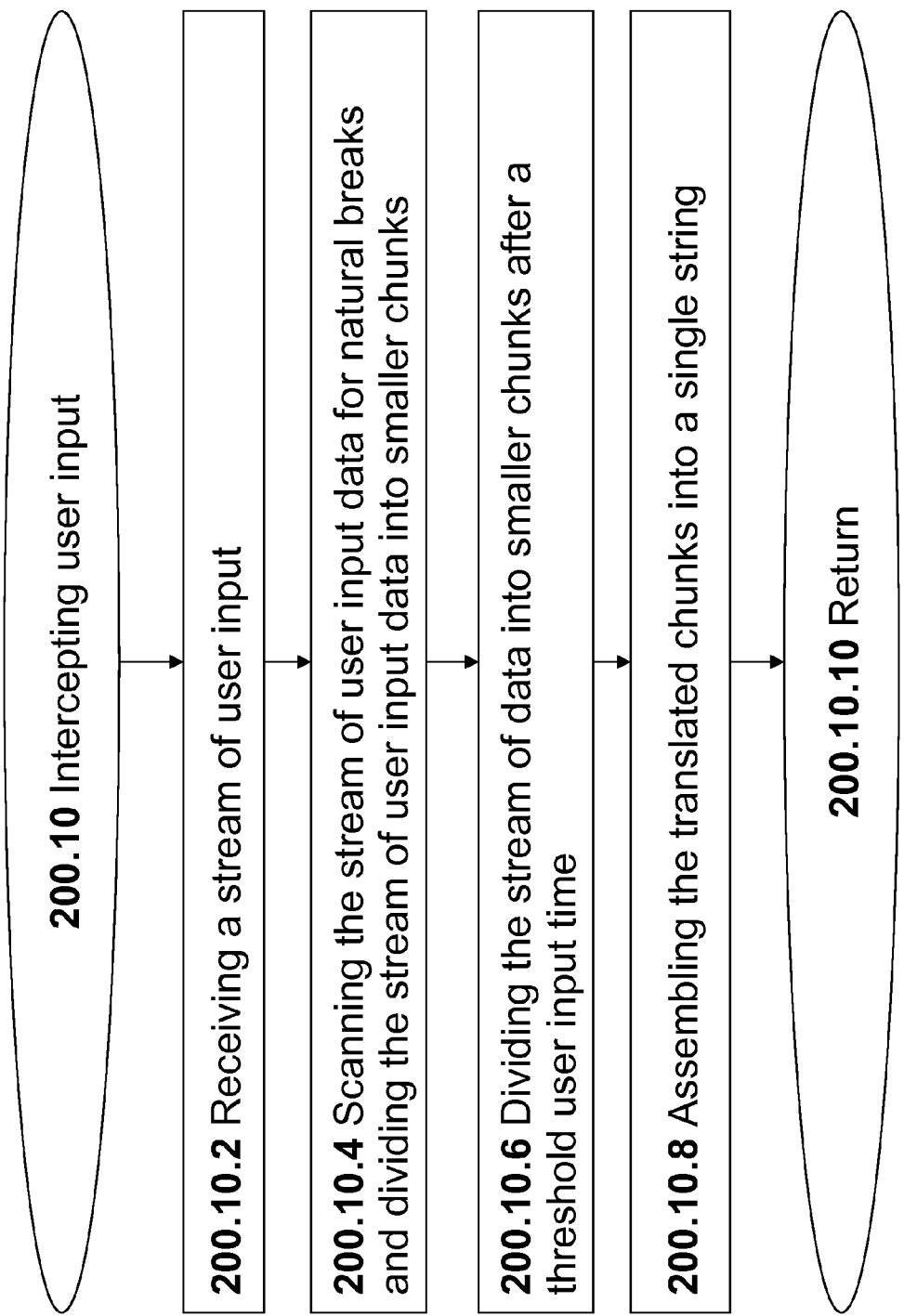

Referring to FIG. 3C, optional logical sub-process steps 200.10.2 to 200.10.10 for optimizing intercepting user input step 200.10 are described.

Step 200.10.2 is for receiving a stream of user input.

Step 200.10.4 is for scanning the stream of user input data for natural breaks and dividing the user input data into smaller chunks.

Step 200.10.6 is for dividing the stream of data into smaller chunks after a threshold user input time.

Step 200.10.8 is for assembling the translated chunks into a single string.

Step 200.10.10 signals the end of the sub-process and the return to the main process 200.

Referring to FIG. 4, an example schematic screen diagram showing a graphical user interface (GUI) 400 is described. GUI 400 provides interface for application interaction translator settings and comprises: source language determination 402; source language 404; target language 406; further language interface 408; translation server addresses 410; and translation service determination 412. GUI 400 allows a user to change and add to one or more of the displayed settings.

Source language determination 402 provides an interface and automatic language determination using language reference 210 to determine the source language of the application prompts and the target language of the user responses. The source language determination 402 interface can be set to automatic or manual by the user and is shown as set to manual in the example.

Source language 404 provides an interface for the source language and is shown as set to English. A user can change the source language of the application by editing the interface of source language 404 or the source language can be automatically set.

Target language 406 provides an interface for the target language and is shown as set to French in the example. A user can change the target language by editing the interface provided by target language 406. In another embodiment, it would be possible for ITC 38 to automatically determine the target language after a user input is received.

Further language interface 408 adds a further target language interface with an associated further target language. ITC 38 provides one or more further interfaces so that $3^{rd}$ or $4^{th}$ or more languages can be added. Multiple languages would be particularly useful in training conferences. The further simulated interfaces are for reference only and do not feed input into the application.

Translation server addresses 410 provides for adding or changing a translation service and address from the list of translation server addresses. Three translation services are shown in the example where the first service is local translation engine 36.

Translation service determination 412 provides automatic translation service determination by sending prompts and user input to more than one translation service. Translation service determination 412 provides for determining the best translation service by comparing the translation services. A process of translation service determination is described with reference to FIG. 3B. Translation service determination provides an interface to set whether the determination is automatic or manual. If manual then translation services will be chosen in their order in the translation server address list.

FIG. 5A to 5H are example screens showing final state of a graphical user interface (GUI) 500 of the preferred embodiment.

GUI 500 comprises: window control 501; toolbar 502; source frame 504S; and target frame 504T. Source frame 504S comprises source GUI 506S. Target frame 504T comprises target GUI 506T. Source GUI 506S and target GUI 506T are different instances of the same example GUI 506.

Window control 501 provides for minimizing; maximizing and closing of the GUI 500.

Toolbar 502 provides the following controls: save 502.2; load 502.4; source/target 502.6; and settings 502.8.

Save 502.2 is a control for saving the prompt and user input data in a particular state.

Load 502.4 is a control for loading prompt and user data. Saving and loading of prompt and user data generally breaks the interaction with application 32 and therefore is for demonstrating and testing purposes only.

Source/Target 502.6 provides for toggling the frames of GUI 500 so that one or both of the source frame 504S and target frame 504T are displayed.

Setting 502.8 provides a user button for opening GUI 400.

In the preferred embodiment, application 32 sends prompt output to provide GUI 506 and in this example GUI 506 comprises two user prompts 508 and 510. User prompt 508 prompts the user in English "Please enter your name" and provides an input field to receive the user input. User prompt 510 prompts the user in English "Please enter your request" and provides an input field to receive the user input.

GUI 500 uses the prompt output from application 32 to create two instances of GUI 506: Source GUI 506S using the source language (English in this example) and target GUI 506T using the target language (French in this example). Source GUI 506S comprises two corresponding user prompts 508S and 510S. Target GUI 506T comprising two corresponding user prompts 508T and 510T.

Referring individually to FIGS. 5A to 5H, progressive states of example GUI 500 are now described when both GUI 506S and 506T are displayed.

Figure 5A:
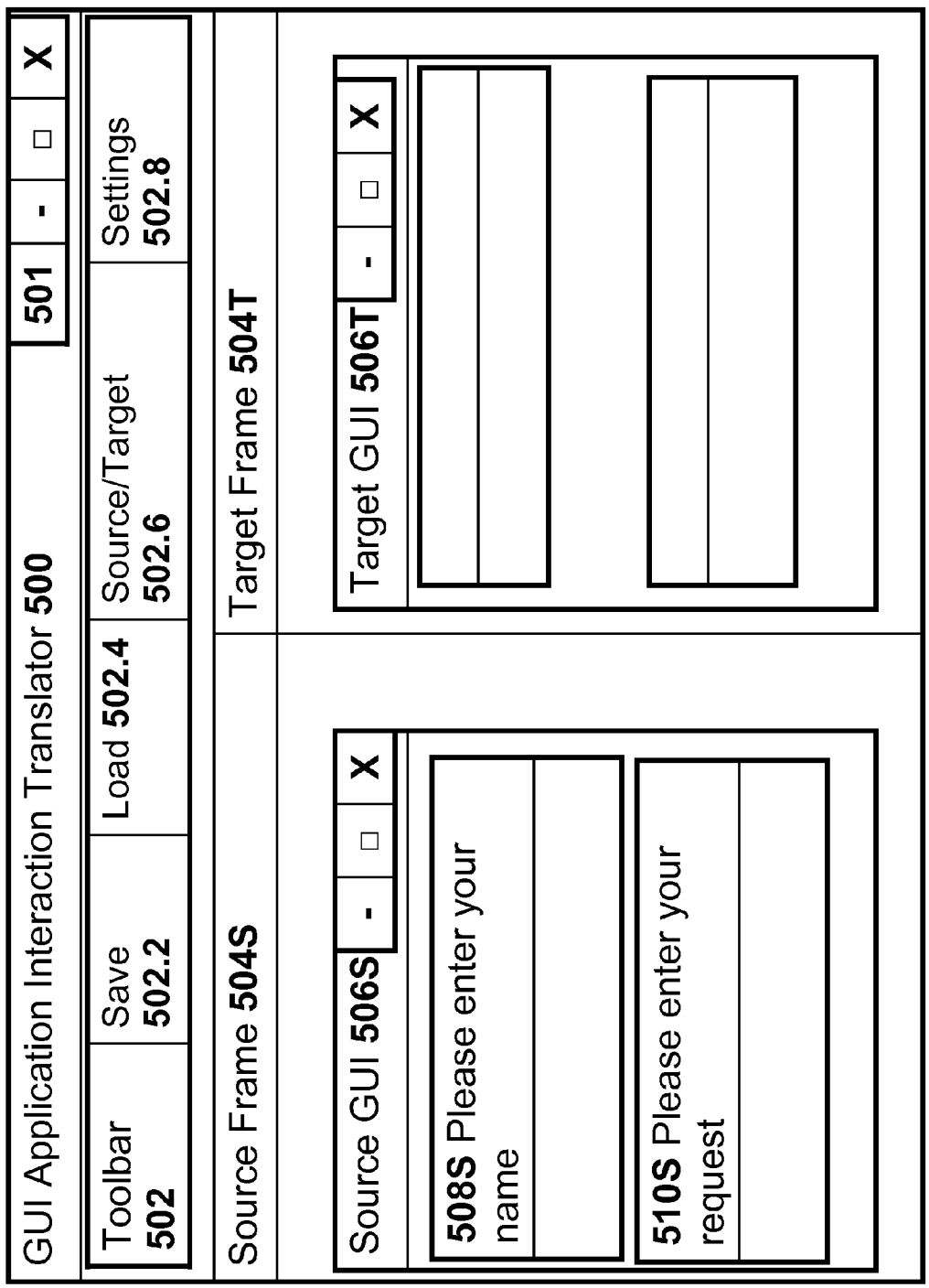

In FIG. 5A, the initial state, GUI 506S displays user prompt 508S and 510S in English as this is the language of the prompts as determined by ITC 38 (or manually set). User prompt 508S prompts the user "Please enter your name" and provides an input field to receive the user input. User prompt 510S prompts the user "Please enter your request" and provides an input field to receive the user input. No direct user input is accepted in user prompts 508S and 510S.

Figure 5B:
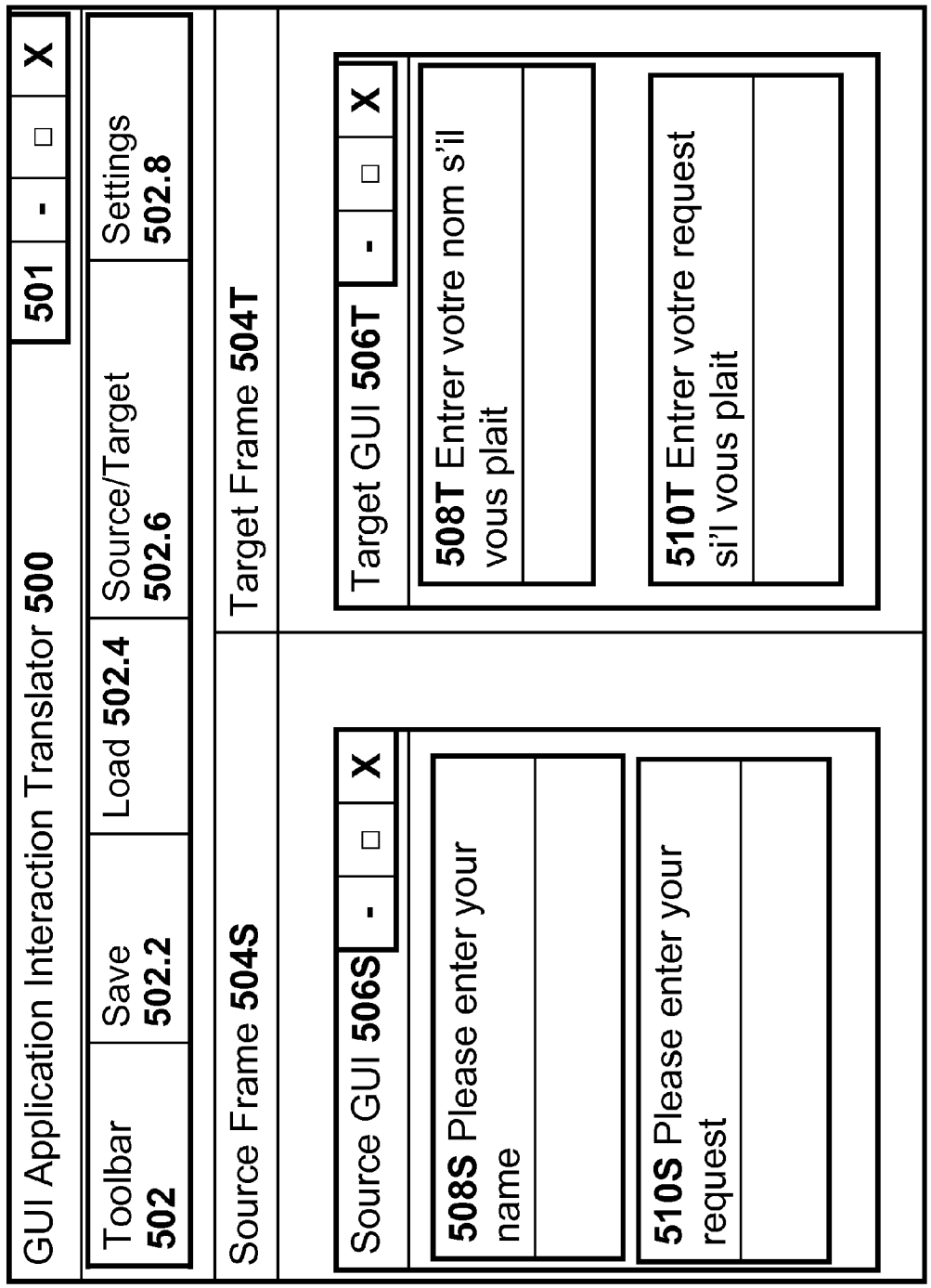

In FIG. 5B, after translation of the user prompts, GUI 506T displays translated user prompt 508T and 510T in French after translation as this is the language that is set. User prompt 508T prompts the user "Entrer votre nom s'il vous plait" and provides an input field to receive the user input. User prompt 510S prompts the user "Entrer votre request si'l vous plait" and provides an input field to receive the user input.

Figure 5C:
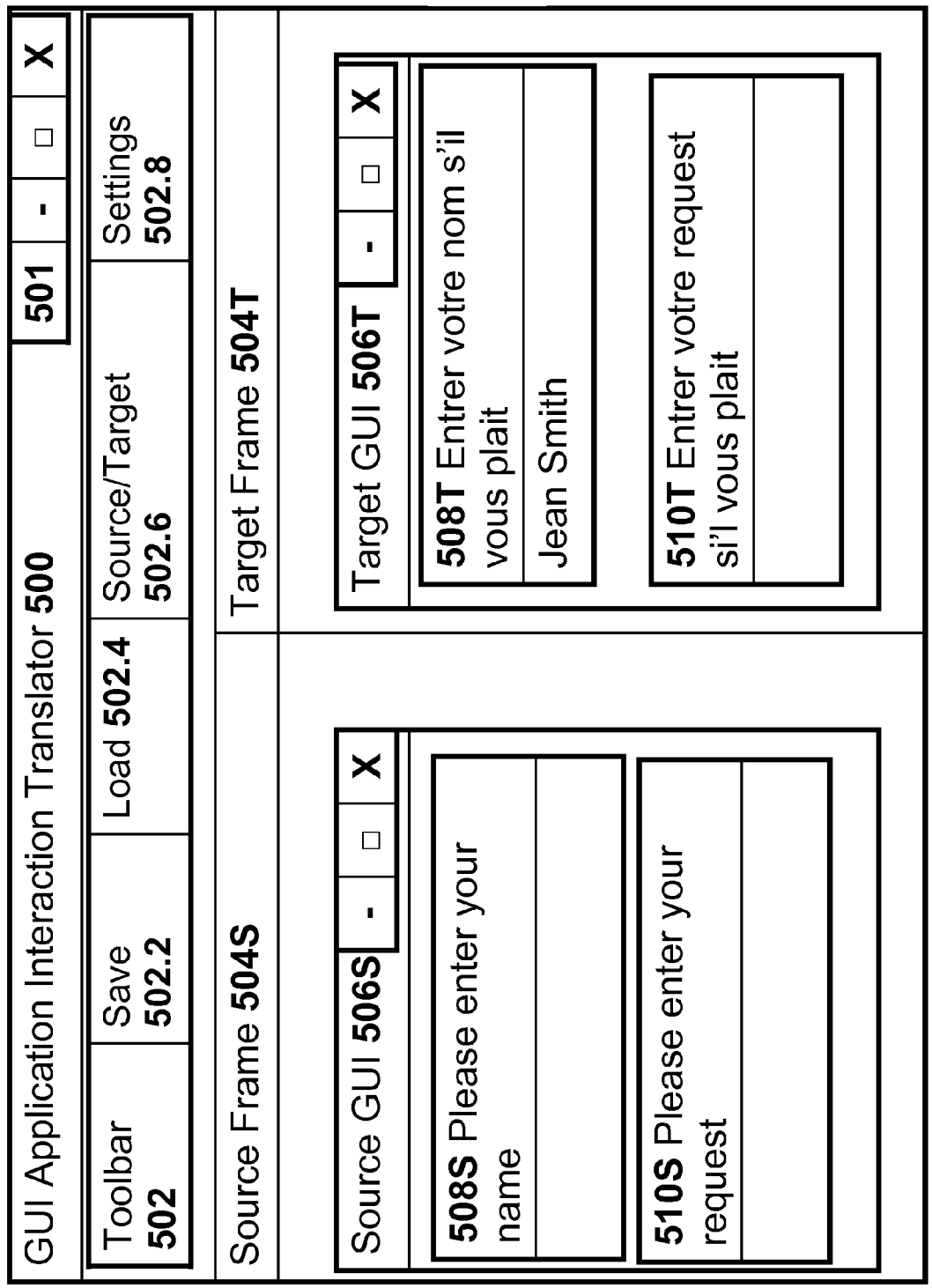

In FIG. 5C, a first input state, the user provides input, in the GUI example the prompts can be answered in any order, and enters his name "Jean Smith" in the input field of prompt 508T.

Figure 5D:
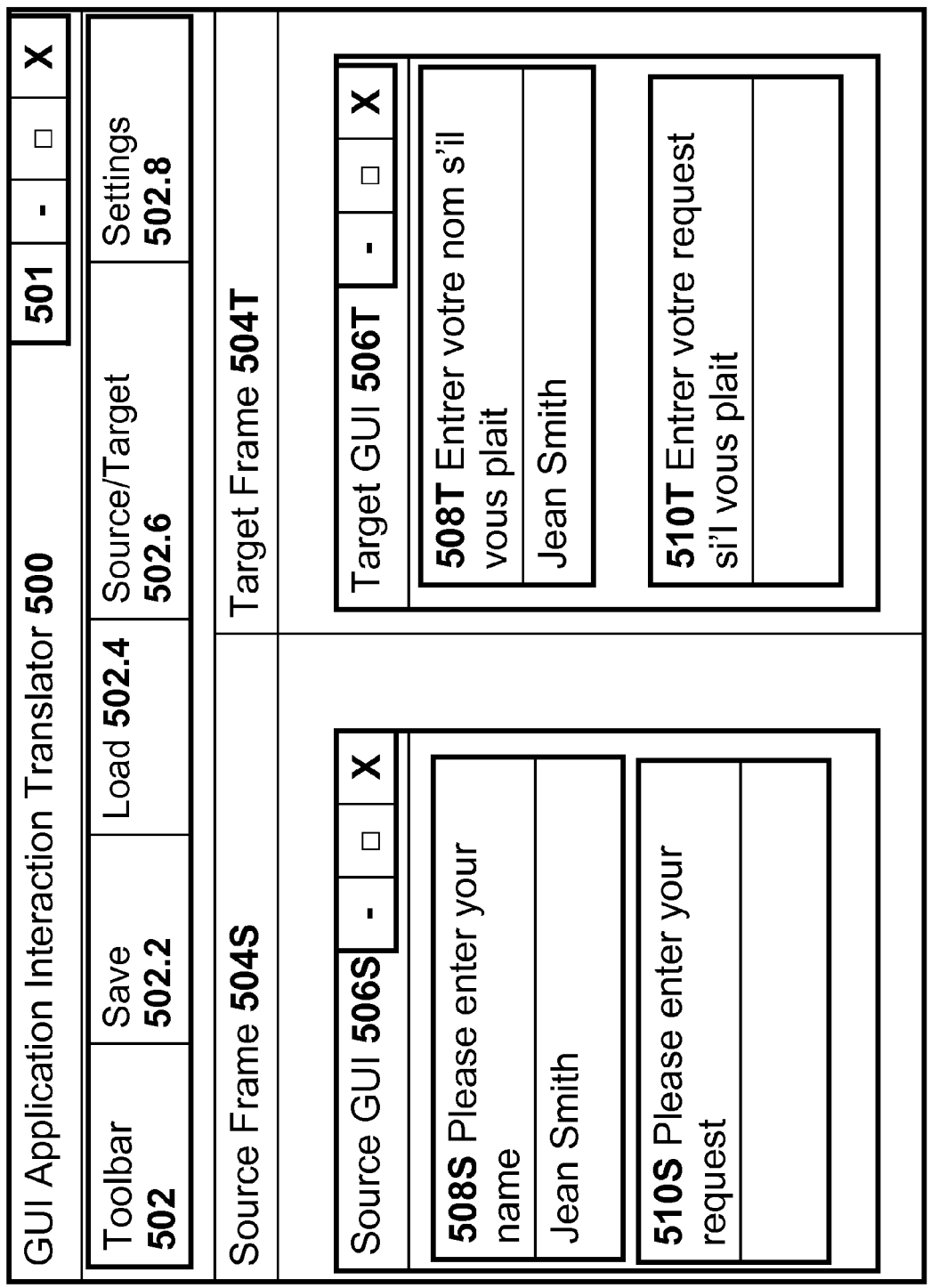

In FIG. 5D, the original user input "Jean Smith" is not translated but displayed in prompt 508S. The user input is sent as is to the application 32 as a response to the prompt. ITC 38 provides for prompts such as proper names, recognizing the type of input prompt (and/or the actual input data) and understanding that no translation is required.

Figure 5E:
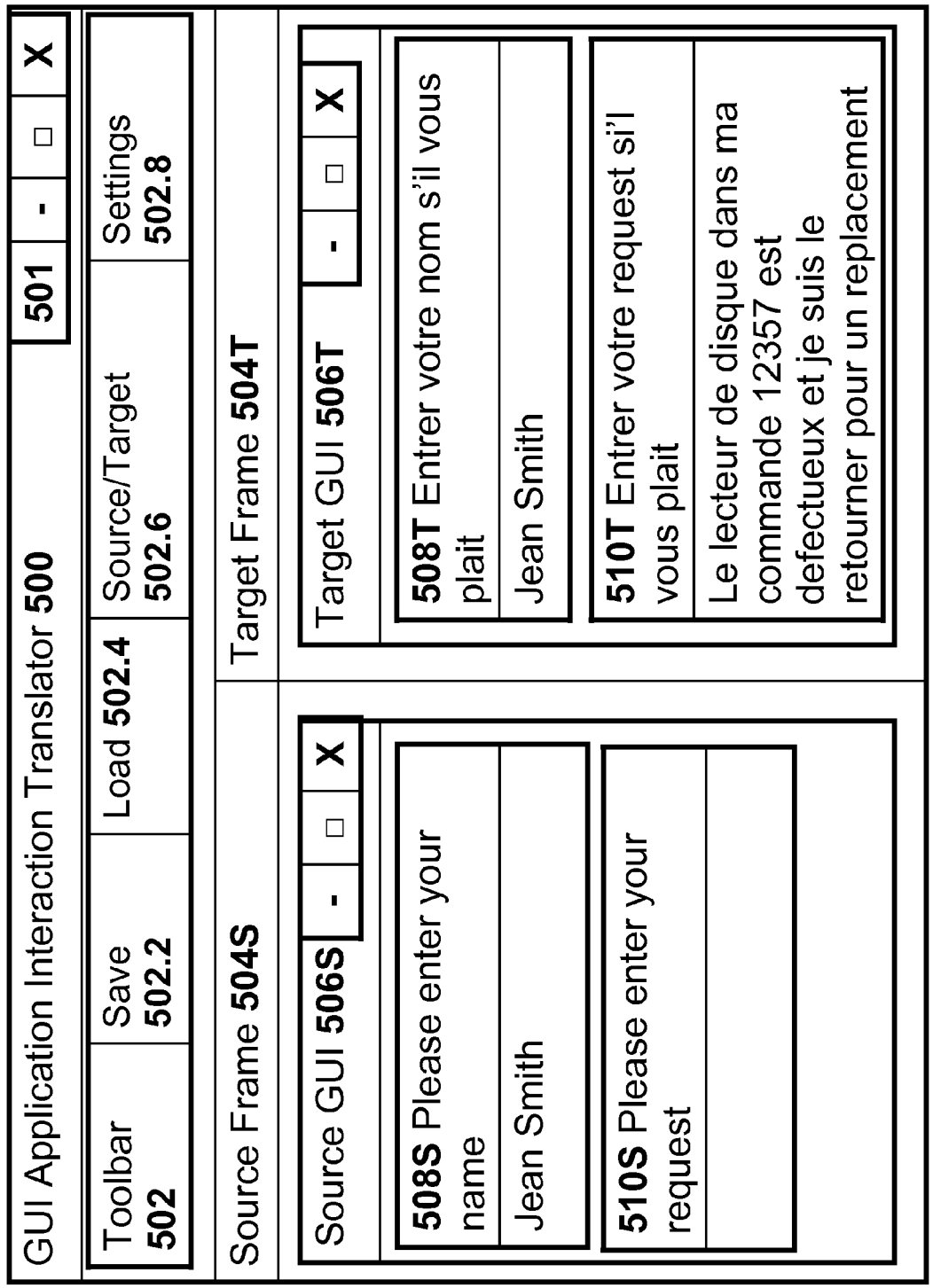

In FIG. 5E, a second input state, the user provides input and enters his request "Le lecteur de disque dans ma commande 12357 est defectueux et je suis le retourner pour un replacement" in the input field of prompt 510T.

In FIG. 5F, a final state, the translation "The disk drive in my order 12357 is faulty and I am returning it for a replacement" is displayed in prompt 510S. The translation is sent to application 32 as a response to the prompt.

In all states of FIGS. 5A to 5F, source GUI 506S and target GUI are shown side by side for comparison.

Figure 5G:
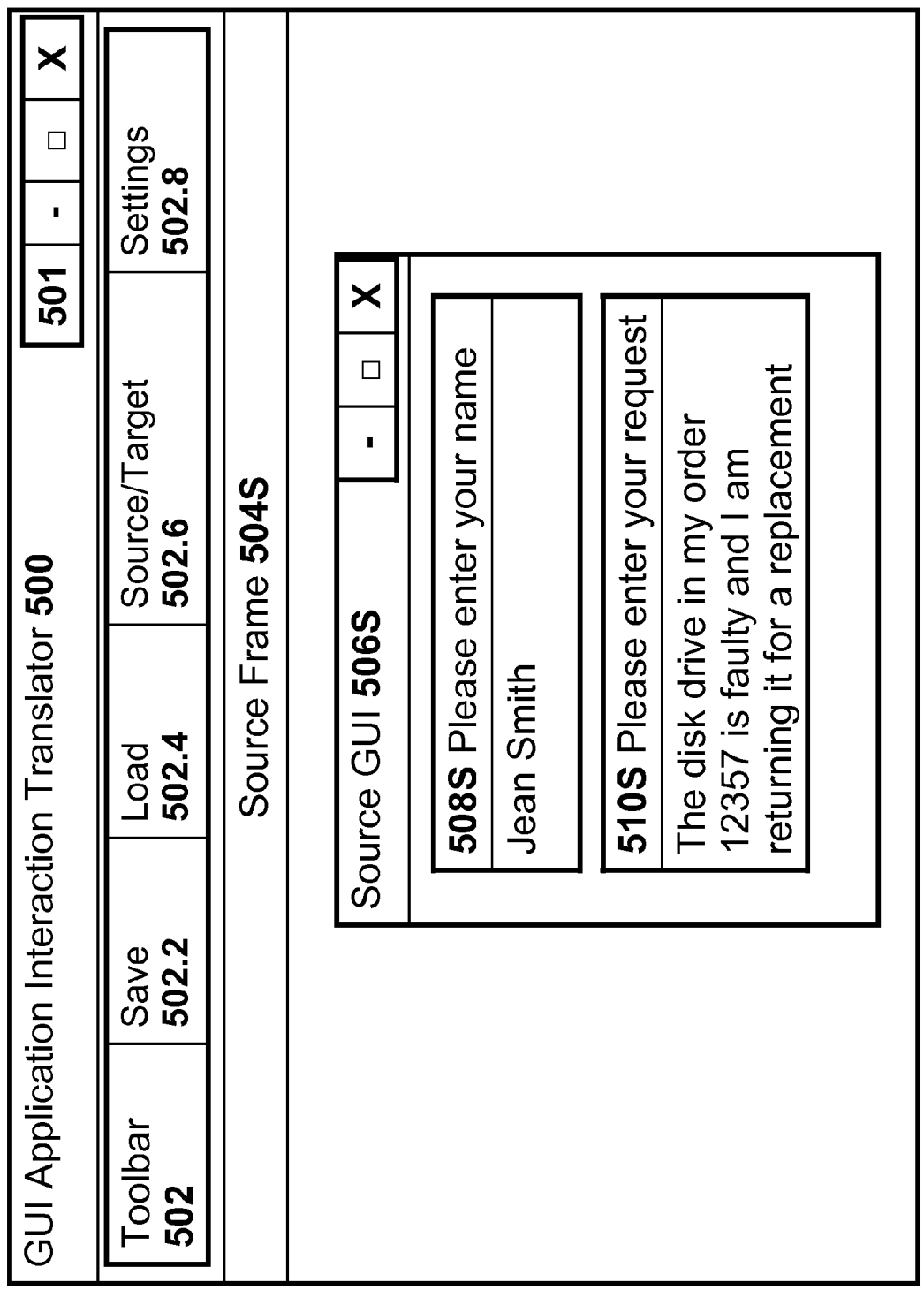

In FIG. 5G, GUI 500 is toggled using source/target 502.6 to display only the source GUI 506S.

Figure 5H:
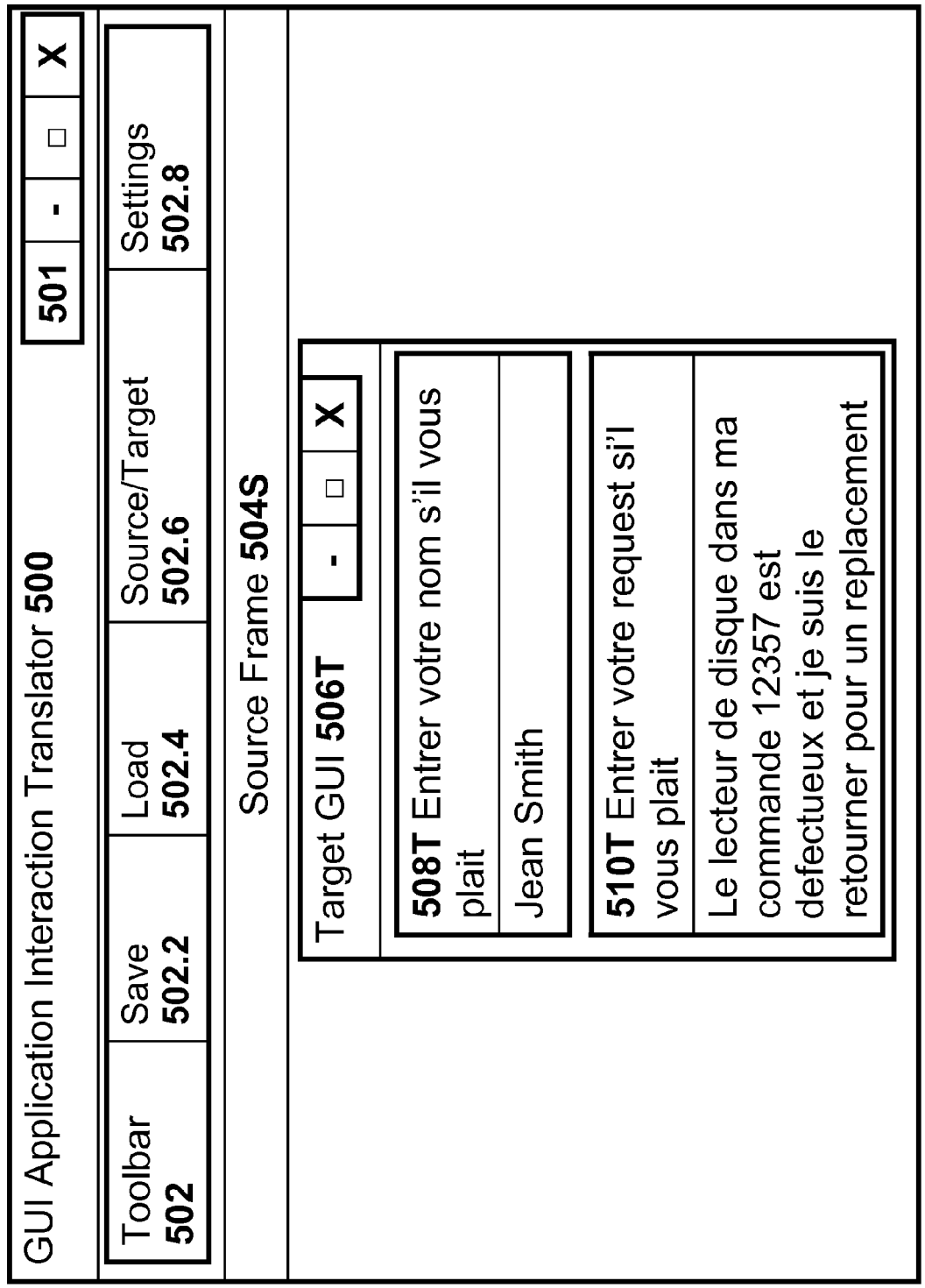

In FIG. 5H, GUI 500 is toggled using source/target 502.6 to display only the target GUI 506T.

In any state, the user may save the prompt and input data and/or add or subtract further language interfaces.

FIG. 6A to 6H are example screens showing states of a terminal user interface of another embodiment that is not graphical.

In FIGS. 6A to 6H, terminal windows 600S and 600T each comprise: window controls (for minimizing; maximizing and closing the terminal window) and a frame.

Terminal commands (not shown) provide the functionality for: saving; loading; toggling the source/target terminals; and changing the settings.

In the this embodiment, application 32 provides prompts for terminal interface 600S with first user input prompt "Please enter your name" and second user input prompt "Please enter your request".

ITC 38 creates the prompts intercepted from the application to create two instances of the terminal interfaces: Source 600S using the source language and target terminal 600T using the target language.

Progressive states of examples terminals are now described.

Figure 6A:
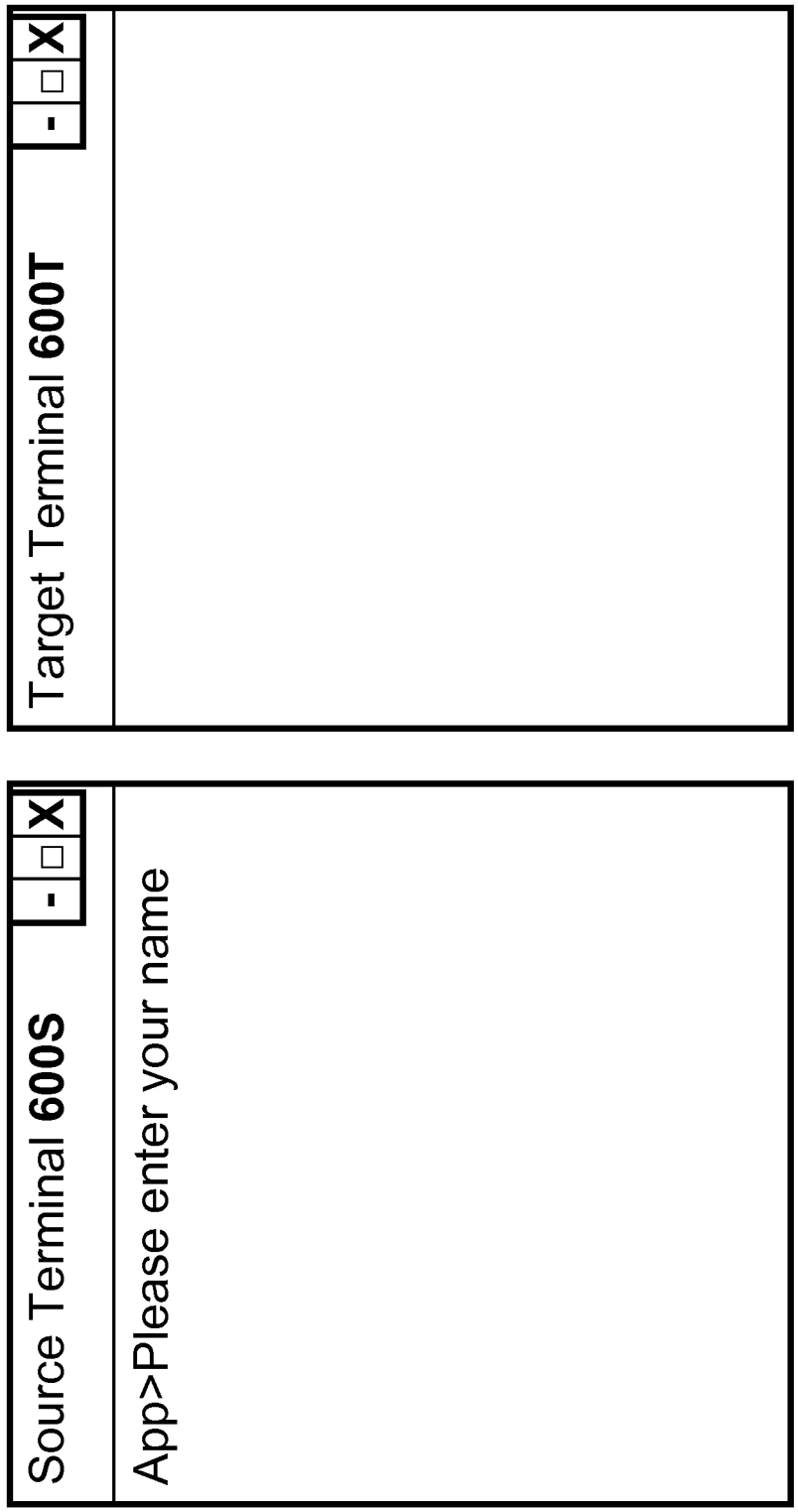

In FIG. 6A, the initial state, terminal 600S displays user prompt "Please enter your name" in English as this is the language of the prompts as determined by ITC 38 (or manually set).

In FIG. 6B, the prompt has been translated; terminal 600T displays the translated user prompt in French after translation "Entrer votre nom s'il vous plait" and provides an input field to receive the user input.

In FIG. 6C, the user has provided input by entering the name "Jean Smith" in the input field of terminal 600T.

Figure 6D:
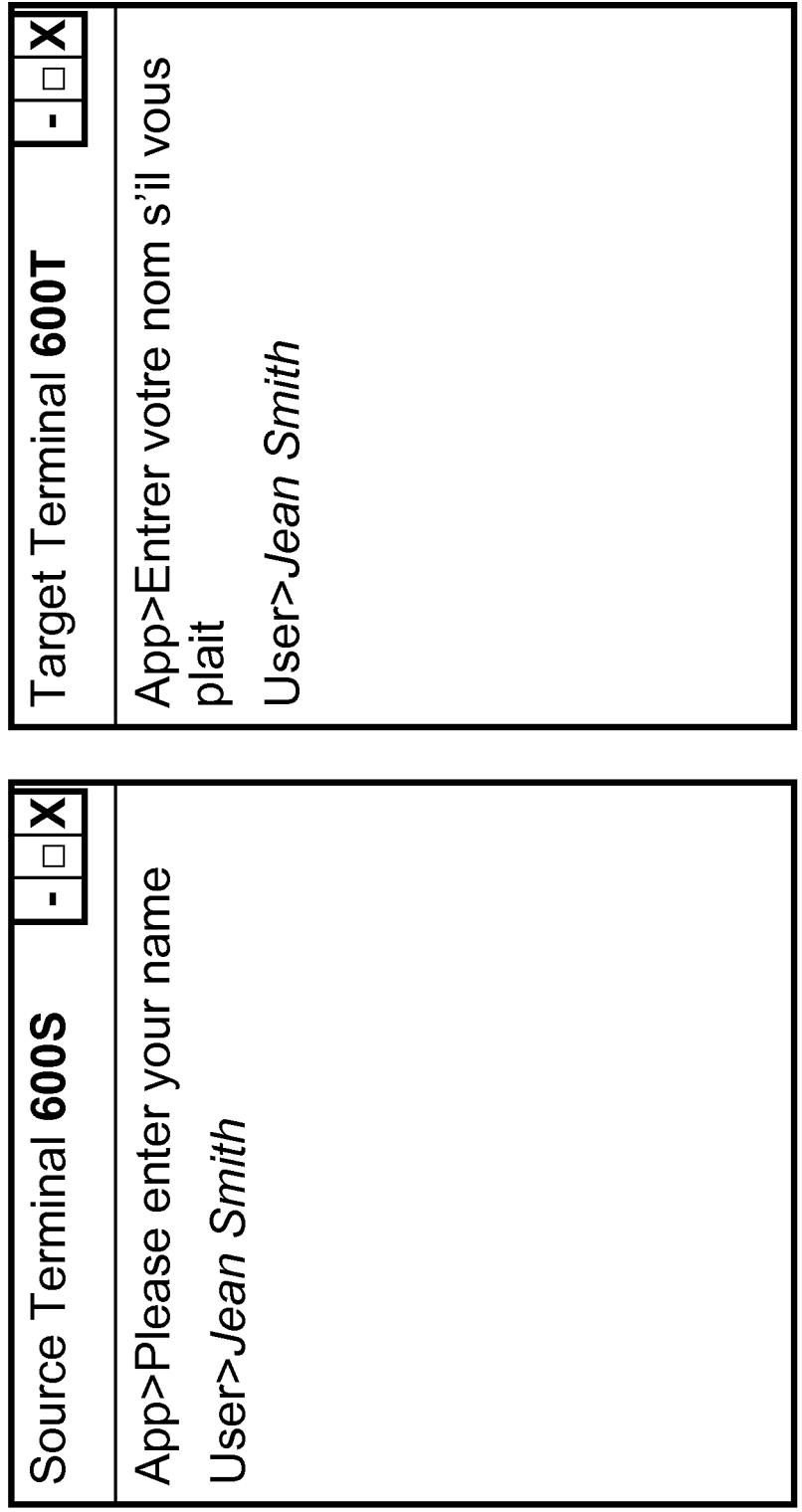

In FIG. 6D, the user input has not been translated because it is recognized as a proper name and is displayed as is in source terminal 600S.

In FIG. 6E, after receiving the first user input, the application has prompted the user for with "Please enter your request" in terminal 600S.

In FIG. 6F, the prompt has been translated; terminal 600T displays the translated user prompt in French after translation "Entrer votre request s'il vous plait" and provides an input field to receive the user input.

In FIG. 6G, the user has provided input by entering the name "Le lecteur de disque dans ma commande 12357 est defectueux et je suis le retourner pour un replacement" in the input field of terminal 600T.

In FIG. 6H, the user input has been translated as "The disk drive in my order 12357 is faulty and I am returning it for a replacement" for the application and is displayed in source terminal 600S.

In any state, the user may save the prompt and input data and/or add or subtract further language interfaces.

In summary, there is described a method for handling computer interactions between a computer application and a user interface, each computer interaction comprising at least one application prompt and user input, said method comprising: intercepting an application prompt output before it reaches the user interface; translating the application prompt from a source language to target user language; sending the translated application prompt to the user interface; intercepting, in response to the application prompt, user input from the user interface; translating the user input from the target language to the source language; sending the translated user input to the application in response to the application prompt.

Further embodiments of the invention are now described.

In a preferred embodiment the application prompts are a series of graphical prompts displayed with corresponding user input fields on a graphical windows form. The preferred method intercepts a set of application prompts for creating a set of graphical user inputs, for instance, text input box widgets or check box widgets, and translates all prompts in the set before sending them to the user interface.

In another embodiment, the application prompts are terminal prompts sequentially made over a period of time requiring corresponding sequential user input.

In the preferred embodiment the translation is performed by a local translation service on the same platform allowing offline operation. Using a remote translation service requires the user to provide sometimes sensitive information to third parties in order to fully understand the context of the text being translated. A local translating service removes the need to expose information externally.

Advantageously, the preferred embodiment further allows a choice of remote translation services.

The preferred embodiment would enable users who were not fluent in the language of a product to get familiar and possibly even deploy the product without a translated release.

The preferred embodiment could be implemented with a very wide range of applications and systems such as kiosks in international airports, mobile phones, global positioning system devices, desktops, laptops, servers, help desk software, and customer relationship management systems.

Preferably the present embodiment further comprises simulating a second user interface for receiving application prompts and user input in the source language. The simulated user interface does not accept user input directly from a user but accepts only translated user input from the methods of the present embodiments.

Advantageously the method further comprises: further translating the application prompt and user input from the source language or target language to a further target language and displaying the further translated prompt and user input in application prompt to the user interface; intercepting, in response to the application prompt, user input from the user interface; translating the user input from the target language to the source language; sending the translated user input to the application in response to the application prompt.

In a further aspect of the invention there is provided a method for translating all textual input and output to/from a set of language pairs. All text which is passed from user applications or the operating system are translated on the fly and are presented in the target language, and again all text taken from interactive devices such as the keyboard are translated before passed on to the application. The system has an option to record all interactive textual I/O in local secure formats. A translated-shell command which instructs the OS to attempt language translation in a new pseudo terminal, like the standard Linux® screen command. The translator can be hooked into the existing locale's functionality so it knows the target language or it can be manually specified. The source language can either be manually specified or the translator can attempt to determine this automatically. Linux is a registered trademark of Linus Torvalds in the United States, other countries, or both.

All textual input and output would then run through the translator in real-time. The system automatically identified logical blocks of text and translates these together. Methods are used to identify these blocks of text such as grouping blocks of text which have a carriage return or blank line between the current and next block of text, but with an upper bound on the number of lines in the queue ready to translate. If no logical breaks are found before the upper bound is reached it will translate the chunk of text currently in the queue as not to impact performance. The goal of the system is to allow a user to interact with the system and applications. Translator can either be in the OS or on-line/cloud based using standard APIs.

In another aspect of the invention there is provided a method for the user to translate all textual input and output to/from a set of language pairs. All text which is passed from user applications or the operating system are translated on the fly and are presented in the target language, and again all text taken from interactive devices such as the keyboard are translated before passed on to the application. The existing language translation systems are not interactive and as such it is very difficult to provide real-time support/feedback and generally results in lots of copying and pasting. Also operating systems don't record all the interactive text I/O so the only text available for off-line translation is what's available immediately on screen or in system logs, this system has an option to record all interactive textual I/O in local secure formats. This allows the customer to run through a typical interactive session with feedback in their native language to reproduce an issue but the text can also be output to another translated language either in a live real-time terminal which is translated on the fly for another person or the session text can be post translated if needed. And in the situation of evaluating new software products, having real-time interactive translation is a necessity as it is the only way to get a true feel for a product.

A translated-shell command instructs the OS to attempt language translation in a new pseudo terminal, like the standard Linux screen command. The translator can be hooked into the existing locales functionality so it knows the target language or it can be manually specified. The source language can either be manually specified or the translator can attempt to determine this automatically. All textual input and output would then run through the translator in real-time. To the end user the whole system and any applications would run in full speed and act as natural as a manually translated version would be expected to. The system automatically figures out logical blocks of text and translates these together. Methods are used to identify these blocks of text such as grouping blocks of text which have a carriage return or blank line between the current and next block of text, but with an upper bound on the number of lines in the queue ready to translate. If no logical breaks are found before the upper bound is reached it will translate the chunk of text currently in the queue as not to impact performance. The major benefit is that the language translator is able to read the context and isn't doing word by word translations. The goal of the system is not to provide 100% accurate translation of text, but at least enough for the end user to interact with the system and applications. The translator would ideally be included in the operating system and as such this would work on systems regardless if they were on-line to the internet or off-line, otherwise on-line/cloud bases translation services would be used and would interact with this system through standard APIs and ideally over encrypted connections where available. All console based translation goes through TTY (pseudo terminal, like screen), all GUI goes through the Xwindow services, so it would need to run it's own X server or VNC type server which translated any textual elements a GUI application was instructing to draw.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A method for handling computer interactions between a computer application and a user interface of a data processing system, the method comprising:
   intercepting, by an interface translation controller (ITC) of the data processing system, an application prompt transmitted by the computer application before the application prompt reaches the user interface, wherein an intended destination of the application prompt is the user interface;
   translating the intercepted application prompt from a source language to a target user language;
   in response to translating the intercepted application prompt, transmitting the translated application prompt to the user interface, wherein the user interface is controlled by the ITC;
   in response to transmitting the translated application prompt to the user interface, the ITC intercepting an input from the user interface before the input is sent to the computer application, wherein the intended destination of the input is the computer application, and wherein the input is in the target language;
   translating the intercepted input from the target language to the source language; and
   in response to translating the intercepted input, transmitting the translated input to the computer application, wherein the translated input is sent to the application as input to the application prompt in the source language.

2. The method of claim 1, further comprising:
   generating a source language interface comprising the application prompts and the intercepted input in the source language;
   generating a target language interface comprising the application prompts and the intercepted input in the target language; and
   concurrently displaying, on a display device, the source language interface and the target language interface.

3. The method of claim 1, wherein translating the intercepted input further comprises:
   parsing the intercepted input into a plurality smaller data chunks;
   separately translating each of the plurality of smaller data chunks; and
   in response to separately translating each of the plurality of smaller data chunks, combining the separately translated data chunks into a complete translation.

4. The method of claim 1, wherein translating the intercepted input further comprises:
   transmitting the intercepted input to a first defined translation service;
   determining whether the first defined translation service has failed to translate the input; and
   in response to determining that the first defined translation service has failed to translate the intercepted input, transmitting the intercepted input to a second defined translation service.

5. The method of claim 1, wherein translating the intercepted input further comprises:
   transmitting the intercepted input to a first translation service and a second translation service;
   receiving a first translated input from the first translation service;
   receiving a second translated input from the second translation service;
   comparing the first translated input and the second translated input determine a best translation; and
   selecting the best translation from among the first translated input and the second translated input as the translated input.

6. The method of claim 5, wherein comparing the first translated input and the second translated input further comprises:
   performing a reverse translation on each of the first translated input and the second translated input to create a first reverse translated input and a second reverse translated input; and
   comparing the first reverse translated input and the second reverse translated input to the intercepted input to determine the best translation from among the first translated input and the second translated input, wherein comparing the first reverse translated input and the second reverse translated input to the intercepted input further comprises determining a first match rate of the first reverse translated input to the intercepted input and determining a second match rate of the second reverse translated input to the intercepted input.

7. The method of claim 1, wherein the source language is determined by comparing the application prompt with a set of language references.

8. A system for handling computer interactions between a computer application and a user interface, the system comprising:
   a computer processor; and
   an interface translation controller (ITC) executable by the computer processor to:
   intercept, an application prompt transmitted by the computer application before the application prompt reaches the user interface, wherein an intended destination of the application prompt is the user interface;
   translate the intercepted application prompt from a source language to a target user language;
   in response to translating the intercepted application prompt, transmit the translated application prompt to the user interface, wherein the user interface is controlled by the ITC;
   in response to transmitting the translated application prompt to the user interface, intercept an input from the user interface before the input is sent to the computer application, wherein the intended destination of the input is the computer application, and wherein the input is in the target language;

translate the intercepted input from the target language to the source language; and in response to translating the intercepted input, transmit the translated input to the computer application, wherein the translated input is sent to the application as input to the application prompt in the source language.

9. The system of claim 8, wherein the interface translation controller is further executable by the computer processor to:

generate a source language interface comprising the application prompts and the intercepted input in the source language;

generate a target language interface comprising the application prompts and the intercepted input in the target language; and concurrently display, on a display device, the source language interface and the target language interface.

10. The system of claim 8, wherein translating the intercepted input further comprises:

parsing the intercepted input into a plurality smaller data chunks;

separately translating each of the plurality of smaller data chunks; and in response to separately translating each of the plurality of smaller data chunks, combining the separately translated data chunks into a complete translation.

11. The system of claim 8, wherein translating the intercepted input further comprises:

transmitting the intercepted input to a first defined translation service;

determining whether the first defined translation service has failed to translate the input; and in response to determining that the first defined translation service has failed to translate the intercepted input, transmitting the intercepted input to a second defined translation service.

12. The system of claim 8, wherein translating the intercepted input further comprises:

transmitting the intercepted input to a first translation service and a second translation service;

receiving a first translated input from the first translation service;

receiving a second translated input from the second translation service;

comparing the first translated input and the second translated input determine a best translation; and selecting the best translation from among the first translated input and the second translated input as the translated input.

13. The system of claim 12, wherein comparing the first translated input and the second translated input further comprises:

performing a reverse translation on each of the first translated input and the second translated input to create a first reverse translated input and a second reverse translated input; and comparing the first reverse translated input and the second reverse translated input to the intercepted input to determine the best translation from among the first translated input and the second translated input, wherein comparing the first reverse translated input and the second reverse translated input to the intercepted input further comprises determining a first match rate of the first reverse translated input to the intercepted input and determining a second match rate of the second reverse translated input to the intercepted input.

14. The system of claim 8, wherein the source language is determined by comparing the application prompt with a set of language references.

15. A computer program product, embodied on a non-transitory computer readable storage device, for handling computer interactions between a computer application and a user interface, the computer program product comprising an interface translation controller (ITC) that is configured to:

intercept, an application prompt transmitted by the computer application before the application prompt reaches the user interface, wherein an intended destination of the application prompt is the user interface;

translate the intercepted application prompt from a source language to a target user language;

in response to translating the intercepted application prompt, transmit the translated application prompt to the user interface, wherein the user interface is controlled by the ITC;

in response to transmitting the translated application prompt to the user interface, intercept an input from the user interface before the input is sent to the computer application, wherein the intended destination of the input is the computer application, and wherein the input is in the target language;

translate the intercepted input from the target language to the source language; and in response to translating the intercepted input, transmit the translated input to the computer application, wherein the translated input is sent to the application as input to the application prompt in the source language.

16. The computer program product of claim 15, wherein the interface translation controller is further configured to:

generate a source language interface comprising the application prompts and the intercepted input in the source language;

generate a target language interface comprising the application prompts and the intercepted input in the target language; and concurrently display, on a display device, the source language interface and the target language interface.

17. The computer program product of claim 15, wherein translating the input further comprises:

parsing the intercepted input into a plurality smaller data chunks;

separately translating each of the plurality of smaller data chunks; and in response to separately translating each of the plurality of smaller data chunks, combining the separately translated data chunks into a complete translation.

18. The computer program product of claim 15, wherein translating the input further comprises:

transmitting the intercepted input to a first defined translation service;

determining whether the first defined translation service has failed to translate the input; and in response to determining that the first defined translation service has failed to translate the intercepted input, transmitting the intercepted input to a second defined translation service.

19. The computer program product of claim 15, wherein translating the user input further comprises:

transmitting the intercepted input to a first translation service and a second translation service;

receiving a first translated input from the first translation service;

receiving a second translated input from the second translation service;

comparing the first translated input and the second translated input determine a best translation; and selecting the best translation from among the first translated input and the second translated input as the translated input.

20. The computer program product of claim 19, wherein comparing the first translated input and the second translated input further comprises:

performing a reverse translation on each of the first translated input and the second translated input to create a first reverse translated input and a second reverse translated input; and comparing the first reverse translated input and the second reverse translated input to the intercepted input to determine the best translation from among the first translated input and the second translated input, wherein comparing the first reverse translated input and the second reverse translated input to the intercepted input further comprises determining a first match rate of the first reverse translated input to the intercepted input and determining a second match rate of the second reverse translated input to the intercepted input.

* * * * *